US010405052B2

(12) United States Patent
Jiang et al.

(10) Patent No.: US 10,405,052 B2
(45) Date of Patent: Sep. 3, 2019

(54) METHOD AND APPARATUS FOR IDENTIFYING TELEVISION CHANNEL INFORMATION

(71) Applicant: Tencent Technology (Shenzhen) Company Limited, Shenzhen (CN)

(72) Inventors: Mei Jiang, Shenzhen (CN); Hailong Liu, Shenzhen (CN); Jian Liu, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/956,492

(22) Filed: Apr. 18, 2018

(65) Prior Publication Data
US 2018/0242047 A1 Aug. 23, 2018

Related U.S. Application Data

(63) Continuation of application No. 15/176,030, filed on Jun. 7, 2016, now Pat. No. 9,980,009, which is a (Continued)

(30) Foreign Application Priority Data

Jun. 12, 2014 (CN) .......................... 2014 1 0262126

(51) Int. Cl.
H04N 21/482 (2011.01)
H04N 21/414 (2011.01)
(Continued)

(52) U.S. Cl.
CPC ..... *H04N 21/482* (2013.01); *H04N 21/41407* (2013.01); *H04N 21/43637* (2013.01); *H04N 21/44008* (2013.01); *H04N 21/8146* (2013.01)

(58) Field of Classification Search
CPC ....... H04N 21/41407; H04N 21/44008; H04N 21/43637; G06K 9/00711; G06K 9/2054; G06K 9/3266
See application file for complete search history.

(56) References Cited

U.S. PATENT DOCUMENTS 6,208,385 B1 * 3/2001 Konishi ............... H04N 7/0122
348/556
8,175,413 B1 * 5/2012 Ioffe ........................ G06K 9/20
382/100

(Continued)

FOREIGN PATENT DOCUMENTS

CN 102436575 A 5/2012
CN 103020650 A 4/2013
(Continued)

OTHER PUBLICATIONS

Ozay, Nedret, and Bulent Sankur. "Automatic TV logo detection and classification in broadcast videos." Signal Processing Conference, 2009 17th European. IEEE, Aug. 24, 2009. (Year: 2009).*
(Continued)

*Primary Examiner* — Benjamin R Bruckart
*Assistant Examiner* — Jen-Shi Huang
(74) *Attorney, Agent, or Firm* — Morgan, Lewis & Bockius LLP

(57) ABSTRACT

A digital video conversion device is communicatively coupled to a TV set and a TV signal source, respectively, to pass TV signals from the TV signal source to the TV set. Upon receipt of a TV channel identification request from a mobile terminal via a wireless communication channel, the digital video conversion device acquires an image from the
(Continued)

TV signals currently broadcasted on the TV set and extracts a plurality of station logo characteristic sets from the image, each station logo characteristic set corresponding to one of a plurality of station logo templates. After calculating a similarity score between each station logo characteristic set and a corresponding station logo template, the digital video conversion device identifies one of the plurality of station logo templates as matching the image based on their similarity scores and returns TV channel information associated with the identified station logo template to the mobile terminal.

20 Claims, 5 Drawing Sheets

Related U.S. Application Data continuation of application No. PCT/CN2015/078548, filed on May 8, 2015.

(51) Int. Cl.
   *H04N 21/4363* (2011.01)
   *H04N 21/44* (2011.01)
   *H04N 21/81* (2011.01)

(56) References Cited

U.S. PATENT DOCUMENTS

| | | | |
|---|---|---|---|
| 9,076,071 | B2* | 7/2015 | Chattopadhyay .... G06K 9/3266 |
| 9,148,708 | B2* | 9/2015 | Venkataswamy .......................... H04N 21/8133 |
| 2002/0162120 | A1 | 10/2002 | Mitchell |
| 2005/0229251 | A1* | 10/2005 | Chellapilla ............. G06F 21/31 726/23 |
| 2006/0139492 | A1* | 6/2006 | Ahn ....................... G09G 5/005 348/558 |
| 2007/0041638 | A1 | 2/2007 | Liu et al. |
| 2007/0121997 | A1 | 5/2007 | Harmanci et al. |
| 2008/0240562 | A1 | 10/2008 | Fukuda et al. |
| 2009/0060396 | A1 | 3/2009 | Blessan et al. |
| 2009/0110288 | A1* | 4/2009 | Fujiwara ............ G06K 9/00463 382/190 |
| 2011/0004900 | A1 | 1/2011 | Li |
| 2013/0129215 | A1 | 5/2013 | Jiang |
| 2014/0016864 | A1* | 1/2014 | Chattopadhyay .... G06K 9/3266 382/165 |
| 2014/0270349 | A1 | 9/2014 | Amtrup et al. |
| 2014/0270536 | A1 | 9/2014 | Amptrup et al. |
| 2014/0298380 | A1* | 10/2014 | Venkataswamy .......................... H04N 21/8133 725/32 |
| 2015/0125029 | A1 | 5/2015 | Li |
| 2016/0105719 | A1 | 4/2016 | Thorwirth et al. |

FOREIGN PATENT DOCUMENTS

| | | |
|---|---|---|
| CN | 103473551 A | 12/2013 |
| CN | 103530655 A | 1/2014 |
| CN | 104023249 A | 9/2014 |
| WO | WO 2014082353 A1 | 6/2014 |

OTHER PUBLICATIONS

H. Y. Kim, M. C. Kang, S. H. Chae, D. H. Kim and S. J. Ko, "An improved logo detection method with learning-based verification for video classification," 2014 IEEE Fourth International Conference on Consumer Electronics Berlin (ICCE-Berlin), Berlin, 2014, pp. 192-193 (Year: 2014).*

J. R. Cozar, P. Nieto, J. M. Gonzalez-Linares, N. Guil and Y. Hernandez-Heredia, "Detection of logos in low quality videos," 2011 11th International Conference on Intelligent Systems Design and Applications, Cordoba, 2011, pp. 630-635 (Year: 2011).*

T. Chattopadhyay and C. Agnuru, "Generation of electronic program guide for RF fed TV channels by recognizing the channel logo using fuzzy multifactor analysis," IEEE International Symposium on Consumer Electronics (ISCE 2010), Braunschweig, 2010, pp. 1-4 (Year: 2010).*

Tencent Technology, ISRWO, PCT/CN2015/078548, dated Aug. 14, 2015, 7 pgs.

Tencent Technology, IPRP, PCT/CN2015/078548, dated Dec. 15, 2016, 5 pgs.

* cited by examiner

METHOD AND APPARATUS FOR IDENTIFYING TELEVISION CHANNEL INFORMATION

RELATED APPLICATIONS

This application is a continuation application of U.S. application Ser. No. 15/176,030 filed on Jun. 7, 2016, which is a continuation application of PCT Patent Application No. PCT/CN2015/078548, entitled "METHOD AND APPARATUS FOR IDENTIFYING TELEVISION CHANNEL INFORMATION" filed on May 8, 2015, which claims priority to Chinese Patent Application No. 201410262126.6, entitled "TELEVISION CHANNEL IDENTIFICATION METHOD AND APPARATUS" filed on Jun. 12, 2014, all of which are incorporated by reference in their entirety.

TECHNICAL FIELD

The present application relates to the field of image identification technologies, and in particular, to method and apparatus for identifying television channel information.

BACKGROUND

With the development of web television and digital television, television channel identification services can be effectively applied to analysis of a behavioral habit of a user in watching television programs, so as to develop some customized functions such as advertisement push, message notification and dynamic news release. Because different television channels use different station logos, a television channel may be identified by identifying a station logo in a television video picture.

In a conventional television channel identification method, a station logo in a television video image is simply captured, and then the station logo is compared with a pre-stored station logo image, so as to acquire a successfully matched station logo image as an identified station logo. However, identification precision of the conventional television channel identification method is not high.

SUMMARY

The above deficiencies and other problems associated with the conventional approach of determining the TV channel information are reduced or eliminated by the invention disclosed below. In some embodiments, the present application is implemented in a digital video conversion device (e.g., a set top box) that has one or more processors, radio-frequency circuitry, memory and one or more modules, programs or sets of instructions stored in the memory for performing multiple functions. Instructions for performing these functions may be included in a computer program product configured for execution by one or more processors and stored in a non-transitory computer readable medium.

One aspect of the present application involves a method of determining TV channel information performed at a digital video conversion device. The digital video conversion device is communicatively coupled to a TV set and a TV signal source, respectively, so as to pass TV signals from the TV signal source to the TV set. Upon receipt of a TV channel identification request from a mobile terminal via a wireless communication channel, the digital video conversion device acquires an image from the TV signals currently broadcasted on the TV set and extracts a plurality of station logo characteristic sets from the image, each station logo characteristic set corresponding to one of a plurality of station logo templates. After calculating a similarity score between each station logo characteristic set and a corresponding station logo template, the digital video conversion device identifies one of the plurality of station logo templates as matching the image based on their similarity scores and returns TV channel information associated with the identified station logo template to the mobile terminal.

Another aspect of the present application involves a digital video conversion device including memory, radio-frequency circuitry, one or more processors, and one or more program modules stored in the memory and configured for execution by the one or more processors to perform the method described above.

Yet another aspect of the present application involves a non-transitory computer readable storage medium having stored therein one or more programs for execution by one or more processors of a digital video conversion device. The one or more programs include instructions, when executed by the one or more processors, cause the processors to perform the operations as described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions and advantages of the present application more comprehensive, the following further describes the present application in detail with reference to the accompanying drawings and embodiments. It should be understood that, the specific embodiments described herein are merely used to explain the present application, and are not used to limit the present application.

Figure 1:
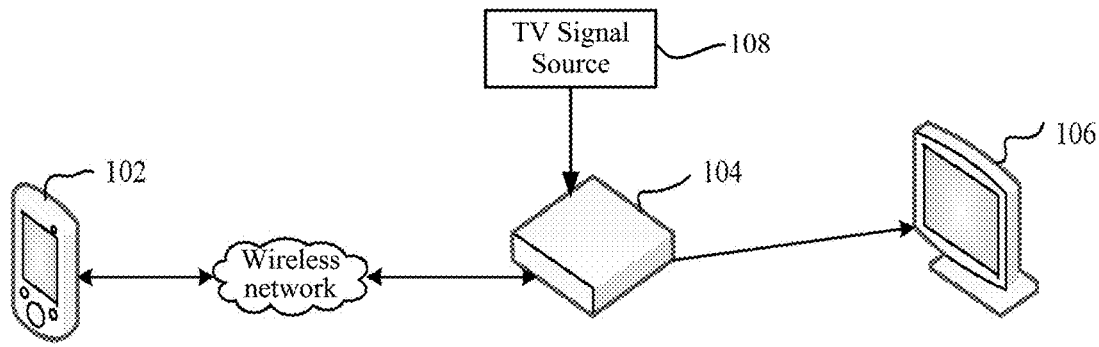
FIG. 1 is a diagram of an application environment of a television channel identification method in accordance with some embodiments of the present application.

A television channel identification method provided in an embodiment of the present application may be applied to a system shown in FIG. 1. Referring to FIG. 1, a mobile terminal 102 interacts with a digital video conversion device 104 (also known as a "set top box") through a wireless network, and the digital video conversion device 104 receives TV signals from a TV signal source 108, processes the TV signals to generate a television video, and transmits the television video to a television set or display 106 for display. The mobile terminal 102 may be a device such as a smart phone, a tablet computer or a personal digital assistant, but is not limited thereto. The wireless network used in interaction between the mobile terminal 102 and the digital video conversion device 104 includes but is not limited to Bluetooth, Wireless Fidelity (WiFi), Radio Frequency Identification (RFID), and the like. The mobile terminal 102 can run an application, and initiate a television channel identification request by using the application. The digital video conversion device 104 receives the television channel identification request, acquires a television video image from the TV signals, where the television video image may be captured from a video signal coming from the source 108 or a television video picture directly acquired from the television set 106, and processes the television video image to obtain a station logo in the television video image, so as to determine the identity of the station logo. Because different television channels are corresponding to different station logos, a corresponding television channel can be obtained according to the identified station logo, then the identified television channel is sent to the mobile terminal 104. The mobile terminal 104 receives the identified television channel and then determines other associated information, e.g., the program currently broadcasted in the channel, and related information (such as an interactive application). The present application can be applied to different service requirements, for example, used to analyze a behavioral habit of a user when watching television programs, thereby pushing a customized message.

Figure 11:
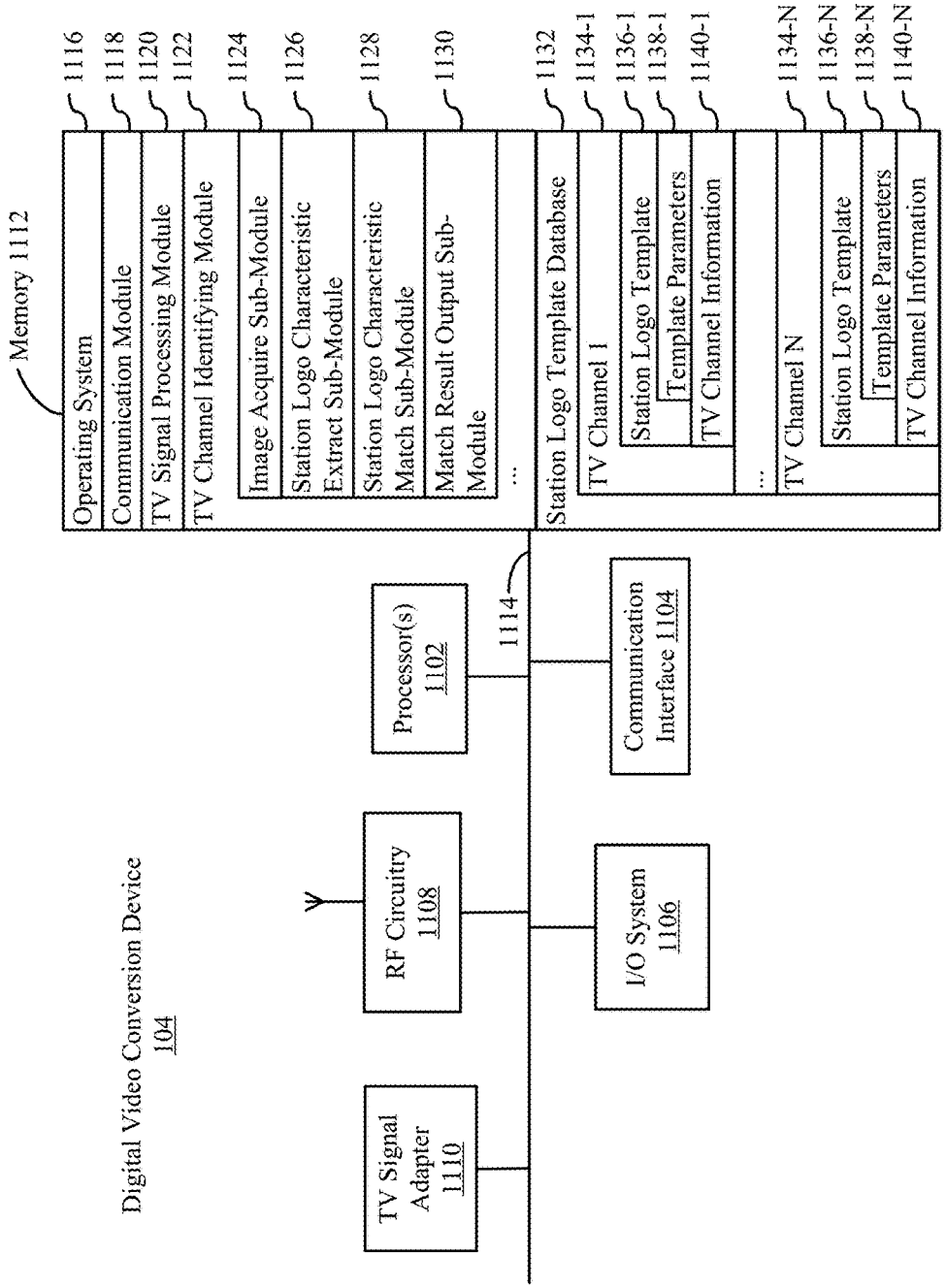
FIG. 11 is a structural block diagram of a digital video conversion device in accordance with some embodiments of the present application.

As shown in FIG. 11, the digital video conversion device 104 includes one or more processors, memory, a bus, a data interface, radio-frequency circuitry, and the like. The data interface is used to receive a cable digital television signal or a wireless digital television signal (a video signal), and the memory is used to store various program instructions and data. The radio-frequency circuitry is used for exchanging information with the mobile terminal 102. The digital video conversion device 104 applicable to the embodiment of the present application can execute specified operations of the television channel identification method, and these operations are executed by the processor by running the program instructions in the memory. The digital video conversion device 104 may be a cable digital television set top box.

Figure 2:
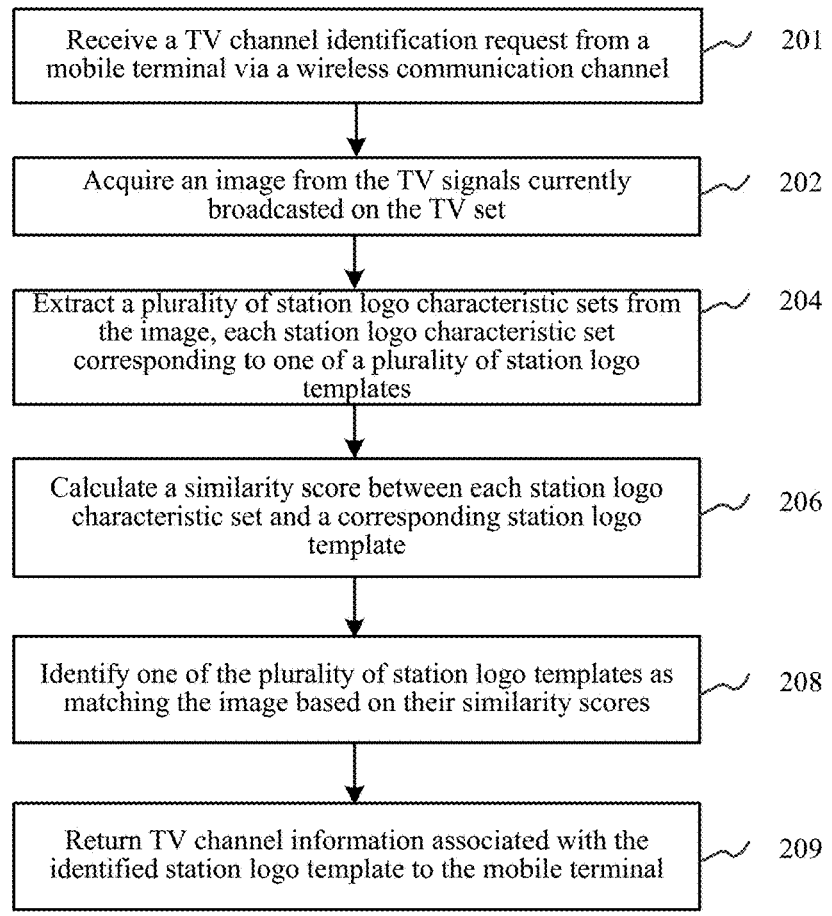
FIG. 2 is a schematic flowchart of a television channel identification method in accordance with some embodiments of the present application.

As shown in FIG. 2, a television channel identification method is provided, and that the method is performed by a digital video conversion device as an example for description. The method includes the following steps:

Step 201: Receive a TV channel identification request from a mobile terminal via a wireless communication channel.

As noted above, the digital video conversion device can interact with a mobile terminal nearby through its radio-frequency circuitry. For example, a user of the mobile terminal who is watching a TV program may want to know more about the TV program such as the name of the TV program, its broadcasting schedule, and an interactive application associated with the TV program. In some embodiments, the user can do so by first sending a TV channel identification request through an application running on the mobile terminal via a wireless communication channel (e.g., Bluetooth or Wi-Fi) between the mobile terminal and the digital video conversion device.

Step 202: Acquire an image from the TV signals currently broadcasted on the TV set upon receipt of the TV channel identification request.

In this embodiment, the television video image may be a television video picture acquired from a television signal from a video signal. A data interface of the digital video conversion device receives the television signal, where the received television signal is a video signal and the video signal is an original television video image frame sequence. The digital video conversion device captures a television video image from the video signal, where the captured television video image has high resolution and is clear. Therefore, the problem such as low resolution or distortion of an image associated with the conventional approaches does not exist.

Step 204: Extract a plurality of station logo characteristic sets from the image, each station logo characteristic set corresponding to one of a plurality of station logo templates in a station logo template library.

The station logo template library is used to store massive station logo templates, where these station logo templates are obtained by extracting characteristics of station logos from massive pre-acquired television video image samples of different television stations. Each station logo template includes a characteristic set of a standard station logo template. The characteristic set herein refers to a combination of unique information for determining a station logo image, and the characteristic set may be used to distinguish one station logo image from other station logo images. In this embodiment, the characteristic set included in each station logo template may include station logo position information, mask information and one or more station logo image attributes. In some embodiments, the characteristic set included in each station logo template may include a station logo type, station logo position information, mask information and a set of station logo image attributes. The image attributes may be construed as an "interesting" part in a digital image. Characteristic extraction is an image processing operation of processing pixel values in an image to determine one or more image attributes that can be used for representing the image.

Further, in an embodiment, the television video image further includes a television picture besides a station logo image region. For each station logo template in the station logo template library, a station logo image region in the television video image may be determined according to the station logo position information and mask information in the station logo template. Then, one or more station logo image attributes of the station logo image region are extracted in the same manner as how the image attributes in the station logo template are generated from pre-acquired television video image samples. Therefore, for a television video image, a station logo characteristic set including station logo position information, mask information, and one or more station logo image attributes corresponding to the station logo template may be obtained. Because there are multiple station logo templates in the station logo template library, the digital video conversion device may generate multiple station logo characteristic sets, one for each station logo template because the digital video conversion device does not know which specific station logo template matches the one in the acquired image yet.

In some embodiments in which the station logo template includes a station logo type. Therefore, after the station logo image region in the television video image is determined, a corresponding image characteristic extraction manner is selected according to a station logo type in a corresponding station logo template, to extract a set of station logo image attributes of the station logo image region.

Step 206: Calculate a similarity score between each station logo characteristic set and a corresponding station logo template.

Specifically, the station logo image attributes of the television video image corresponding to each station logo template are compared with a set of station logo image attributes in the same station logo template to determine a similarity score between the two. A higher similarity score indicates that the station logo in the acquired television video image is more likely to be a station logo of the corresponding station logo template. In this embodiment, a similarity score between the extracted station logo image attributes and the station logo image attributes in the corresponding station logo template may be calculated, and a higher similarity score indicates that the station logo in the television video source matches the station logo template better. As described below, depending on the station logo type of a station logo template, different metrics are used for measuring the similarity score between the station logo characteristic set extracted from an acquired TV image and the station logo template. As such, the similarity score between a station logo characteristic set of a TV image whose actual station logo type is different from that of a station logo template for which the station logo characteristic set is generated should be much lower than the similarity score between a station logo characteristic set of the TV image whose actual station logo type is the same as that of a station logo template for which the station logo characteristic set is generated. This is an important factor for identifying the correct station logo template for an acquired TV image among many candidates in the station logo library.

Step 208: Identify one of the plurality of station logo templates as matching the image based on their similarity scores.

In this embodiment, each station logo template in the station logo template library is corresponding to a specific television channel, for example, a station logo template is corresponding to Hunan Satellite TV. That is, each station logo template has a corresponding relationship with a television channel number. A television channel number corresponding to a station logo template with a highest similarity score between the station logo image attributes in the television video image and the station logo image attributes in the station logo template may be used as an identification result.

Step 209: Return TV channel information associated with the identified station logo template to the mobile terminal. As shown in FIG. 1, the digital video conversion device 104 sends the television channel number to the mobile terminal 102 through a wireless network.

The digital video conversion device returns the TV channel information to the requesting mobile terminal. In some embodiments, the returned TV channel information includes the channel number. Upon receipt of the channel number, the application running on the mobile terminal can identify other information related to the channel number such as the name of the current program broadcasted in the channel, the broadcast schedule of the channel, and an interactive program associated with the current program and display such information to the user of the mobile terminal. In some other embodiments, the returned TV channel information includes information such as the name of the current program broadcasted in the channel, the broadcast schedule of the channel, and the interactive program.

In this embodiment, a station logo characteristic set is extracted from a television video image according to a standard station logo template, and the station logo characteristic set corresponding to each station logo template is compared with a characteristic set in the corresponding station logo template, so that a similarity score between a station logo in the television video image and the station logo template can be obtained, and a television channel corresponding to a station logo template with a highest similarity score is chosen as an identification result, thereby improving precision of television channel identification.

In addition, because the television video image is an image captured from the video signal, real-time station logo detection can be implemented. Moreover, a station logo can be identified by processing only one image, which can save storage space compared with the conventional approach which requires that a section of video stream is truncated and processed, thereby saving costs.

In an embodiment, characteristics in the station logo template include a station logo type, station logo position information, mask information and a set of station logo image attributes.

Figure 3:
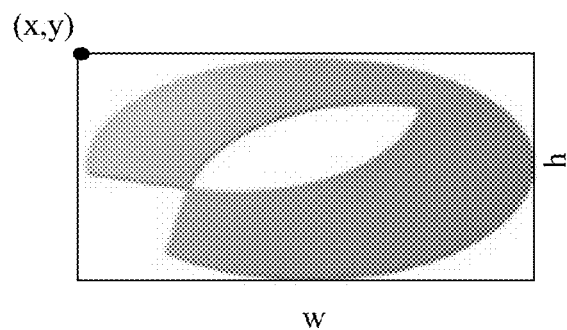
FIG. 3 is a schematic diagram of locating a station logo in accordance with some embodiments of the present application.

The station logo position information is used to determine a position and size of a station logo in a television picture, and a quadrangular region may be used to represent a station logo region. In this embodiment, the station logo position information includes upper left coordinates of the station logo region and the width and height of the station logo region relative to the upper left coordinates. As shown in FIG. 3, the upper left coordinates of the station logo region are (x, y), and relative to the coordinates (x, y), the width is w and the height is h. Therefore, the station logo position information may be expressed as {x, y, w, h}.

Figure 4:
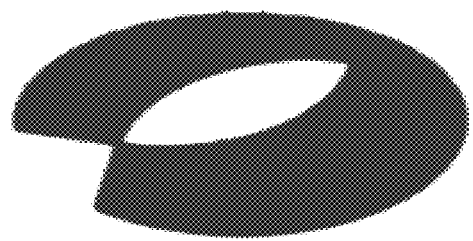
FIG. 4 is a schematic diagram of masking a station logo in accordance with some embodiments of the present application.

In addition, because a television picture background changes a lot, if the foregoing station logo region is directly used as a region of interest (ROI) and processed, background interference is easily caused and an identification rate is reduced. The so-called ROI refers to a region which is outlined during image processing with a square, a circle, an oval or an irregular polygon from a processed image and needs to be processed, so as to reduce image processing time and increases precision. For example, the foregoing station logo region determined according to the station logo position information is an ROI of the television video image. Because the determined station logo region is a regular region, while forms of station logos are varied, the station logo region includes a part of television picture background. Further, the obtained station logo region may be masked once. As shown in FIG. 4, a mask has the same size as the station logo region, but only has two pixel values, which are separately used to indicate whether the pixel of a corresponding position belongs to the station logo image region or a background region. As shown in FIG. 4, a colored pixel part is the station logo image region.

According to color transparency of station logos, the station logos may be classified into two categories: static opaque station logo and static semi-transparent station logo. For example, station logos of most television stations such as Hunan Satellite TV and Jiangsu Satellite TV are static opaque station logos, and station logos of CCTV, Jilin Satellite TV and the like are static semi-transparent station logos. Different image characteristic extraction methods are used to extract image characteristics of different types of station logos, so that the extracted image characteristics are more accurate, so as to further improve accuracy of characteristic matching. After a position and a mask of a station logo in a television video image sample of each television station are determined according to station logo position information and mask information, a set of station logo image attributes may be extracted in a corresponding characteristic extraction manner according to the type of the station logo.

In an embodiment, a static opaque station logo can be distinguished easily due to abundant color and shape information thereof. Therefore, a pixel value of the station logo image region, for example, either one of a color attribute and an edge attribute of the station logo image region, may be used to represent a set of station logo image attributes.

That a color attribute of a station logo image region is used as one station logo image attribute as an example for description. In an embodiment, a color histogram of the station logo image region is used as the station logo image attribute. To further reflect spatial color distribution so as to distinguish station logos with similar colors but different shapes, in this embodiment, a block-level color histogram is used to represent the station logo image attribute. In the block-level color histogram, an image is spatially divided into multiple sub-regions, and a color histogram is extracted from each sub-region, thereby effectively reflecting the spatial color distribution of the image.

Specifically, a process of generating a block-level color histogram is as follows:

1) Divide a station logo image region into M*N sub-blocks.

2) Uniformly quantize three passages in an RGB color space into 8 levels, and collect statistics on colors of station logo pixels of each sub-block, to obtain color distribution of all pixels on 8 quantitative levels in the sub-block, that is, a color histogram of the sub-block.

3) Process all M*N sub-blocks, and connect color histograms of all sub-blocks in series, to obtain a block-level color histogram of a total of M*N*24 dimensions.

4) Normalize the block-level color histogram. Specifically: for a d-dimensional block-level color histogram $\{p_i\}$, $1 \leq i \leq d$, where d=M*N*24, the following operation is performed on each element in the block-level color histogram:

$$p'_i = \frac{p_i}{Z},$$

where Z is a normalization factor and is a sum of elements of d dimensions, that is, $$Z = \sum_{i=1}^{d} p_i,$$

so that all normalized elements meet $$\sum_{i=1}^{d} p'_i = 1.$$

In an embodiment, for a static semi-transparent station logo, because a background change causes great interference to color distribution of the station logo, extraction of a pixel value is generally no longer applicable to the static semi-transparent station logo. Most static semi-transparent station logos have a feature of uniformly distributed textures, and therefore, for a station logo of this category, a texture attribute or a wavelet attribute of the station logo may be used to represent a set of station logo image attributes of the station logo, and the texture attribute of the station logo may be represented by a perceptual hash value of the station logo image region.

Specifically, a process of generating a perceptual hash value of the station logo is as follows:

1) Convert the foregoing determined station logo image region into grayscale.

2) Calculate, according to statistics, an average gray value of pixels in the grayscale station logo image region.

3) Compare a value of each pixel in the grayscale station logo image region with the average value, and if the pixel value is greater than or equal to the average value, record the pixel as 1, and if the pixel value is less than the average value, record the pixel as 0, thereby obtaining a code corresponding to each pixel.

4) Connect codes corresponding to all pixels in series to obtain a string of binary numbers. The string of binary numbers is the perceptual hash value corresponding to the station logo image, and is also referred to as a "fingerprint" of the station logo image, and the fingerprint is used as a set of station logo image attributes of the static semi-transparent station logo.

In this embodiment, different data forms are used to represent image characteristics of different types of station logo images. Especially, an image characteristic of a static semi-transparent station logo is represented by a texture attribute, so that the static semi-transparent station logo can be identified effectively.

For television video image samples of different television stations, a station logo type, station logo position information and mask information of a station logo in the television video image sample may be determined first, and then a corresponding characteristic extraction manner is selected according to the station logo type to extract a set of station logo image attributes corresponding to the station logo image region. For different television stations, corresponding station logo templates may be generated, where a station logo template stores data of a station logo type, station logo position information, mask information and a set of station logo image attributes. For example, a storage format used by the station logo template may be: (type, rect, mask, histogram/hashcode), where type is a station logo type, rect is station logo position information, mask is mask information, histogram is a block-level color histogram corresponding to a station logo image region, and hashcode is a fingerprint corresponding to the station logo image region, and whether the station logo image attribute stored in the station logo template is histogram or hashcode is determined by the station logo type. Each station logo template has a corresponding relationship with a television video number.

Further, in an embodiment, the step of extracting, corresponding to each station logo template in a station logo template library, a station logo characteristic set includes: determining a station logo image region in the television video image according to station logo position information and mask information in the station logo template; and extracting a set of station logo image attributes of the station logo image region according to a station logo type in the station logo template.

Specifically, because each station logo template stores station logo position information and mask information, in a television video image, of a station logo of a different television station, a station logo image region, in the television video image, of a station logo in the television video image is determined according to the station logo position information and mask information stored in each station logo template. Further, a corresponding station logo image attribute extraction manner is determined according to a station logo type in a corresponding station logo template, and a set of station logo image attributes of the station logo image region is extracted according to the station logo image attribute extraction manner. It can be understood that, the characteristic extraction manner for extracting the station logo image attributes of the station logo image region should be the same as a characteristic extraction manner for extracting a set of station logo image attributes in a corresponding station logo template.

In an embodiment, the step of extracting a set of station logo image attributes of the station logo image region according to a station logo type in the station logo template includes: if the station logo type in the corresponding station logo template is static opaque station logo, extracting a pixel value of the station logo image region; and if the station logo type in the corresponding station logo template is static semi-transparent station logo, generating a perceptual hash value of the station logo image region.

As described above, if the station logo type in the corresponding station logo template is static opaque station logo, the station logo image attribute stored in the station logo template is a block-level color histogram, and in this case, a block-level color histogram of the station logo image region in the television video image may be extracted correspondingly and used as the station logo image attribute of the station logo image region. Likewise, if the station logo type in the corresponding station logo template is static semi-transparent station logo, the station logo image attribute stored in the station logo template is a perceptual hash value, and in this case, a perceptual hash value of the station logo image region in the television video image is extracted correspondingly and used as the station logo image attribute of the station logo image region.

Further, in an embodiment, the step of matching the station logo characteristic set corresponding to each station logo template with a characteristic set in a corresponding station logo template includes: if the station logo type in the station logo template is static opaque station logo, calculating an image difference between the foregoing obtained pixel value of the station logo image region and the station logo image attributes in the station logo template, where a smaller image difference indicates a higher similarity score between the station logo in the television video image and the corresponding station logo template; and if the station logo type in the station logo template is static semi-transparent station logo, comparing the foregoing obtained perceptual hash value of the station logo image region with the station logo image attribute in the station logo template bit by bit, to obtain a percentage of the number of same bits in the two to the total length of binary code, where a larger percentage indicates a higher similarity score between the station logo in the television video image and the corresponding station logo template.

Specifically, in this embodiment, that the pixel value is a block-level color histogram as an example for description. For the station logo image region in the television video image, a station logo type stored in each station logo template in the station logo template library is detected, and if the station logo type is static opaque station logo, a block-level color histogram in the station logo image region in the television video image is also extracted correspondingly. For an extraction method, refer to the foregoing method for generating a block-level color histogram, which is not described repeatedly herein. A similarity score between the extracted block-level color histogram and the station logo image attribute in the corresponding station logo template (that is, a block-level color histogram of a standard station logo image) is calculated. The similarity score may be one of a Bhattacharyya distance, an Euclidean distance, a histogram correlation and a histogram intersection between two block-level color histograms.

Calculating a Bhattacharyya distance between two block-level color histograms is used as an example for description. A block-level color histogram of a standard station logo image stored in the station logo template may be expressed as a d-dimensional block-level color histogram p, which meets $$\sum_{i=1}^{d} p_i = 1.$$

A block-level color histogram extracted from a station logo image region in a television video image may be expressed as a d-dimensional block-level color histogram q, which meets $$\sum_{i=1}^{d} q_i = 1.$$

Therefore, the Bhattacharyya distance between the block-level color histograms p and q is:

$$\text{score}(p, q) = \sum_{i=1}^{d} \sqrt{p_i q_i}.$$

In the formula, score$\in[0,1]$, which qualitatively reflects a similarity score between the two block-level color histograms. If the similarity is close to 1, it indicates that the two block-level color histograms are likely to be from a same image; otherwise, it indicates that an image difference between the two block-level color histograms is great.

In this embodiment, if the station logo type stored in the station logo template is static semi-transparent station logo, a set of station logo image attributes stored in the corresponding station logo template is a perceptual hash value of a standard station logo image, where the perceptual hash value is a string of binary codes. Correspondingly, when the station logo image attribute is extracted from the station logo image region in the television video image, a perceptual hash value in the station logo image region is extracted. For a specific extraction method, refer to the foregoing description. Because the two extracted perceptual hash values are both strings of binary codes, and a percentage of the number of same bits in the two strings to the total length of binary codes may be calculated according to statistics and used as a measurement of the similarity score between the station logo image region in the television video image and the standard station logo image.

For example, if the perceptual hash value of the standard station logo image stored in the station logo template is a string of binary codes $h_1$ with a length of n, and the perceptual hash value extracted from the station logo image region obtained from the television video image is binary codes $h_2$, whose length is also n, a percentage of the number of the same bits in $h_1$ and $h_2$ to the total length n of the binary codes is:

$$\text{score}(h_1, h_2) = \frac{\#\{1 \le i \le n \mid h_1(i) = h_2(i)\}}{n}.$$

In the formula, $\#\{x\}$ represents the number of elements in a set x, score$\in[0,1]$, and if the value is close to 1, it indicates that the similarity score between the two images is high; otherwise, the similarity is low.

After the similarity score between the station logo image attributes extracted from the station logo image region in the television video image and the station logo image attributes in the corresponding station logo template is obtained, a station logo template with a highest similarity score may be acquired, and a television channel number corresponding to the station logo template with the highest similarity score may be used as an identification result.

For different types of station logos, different more suitable station logo image attribute extraction manners are used, so that an extracted station logo image attribute is more accurate so as to improve accuracy of subsequent characteristic matching, thereby improving identification precision.

In an embodiment, the station logo template includes a parent template and multiple child templates located in the same station logo template as the parent template.

Figure 5:
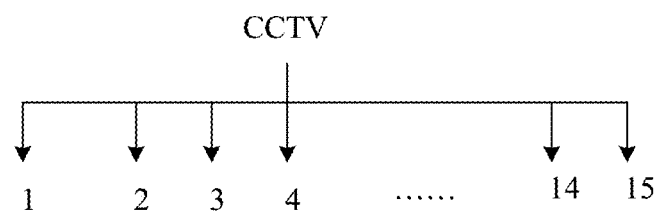
FIG. 5 is a schematic diagram of station logo classification in accordance with some embodiments of the present application.

At present, many station logos are expressed in a form of [a television station logo+a sub-channel name/number], for example, China Central Television (CCTV) includes CCTV1, CCTV2, and so on, and Shenzhen television includes sub-channels such as Shenzhen city channel and Shenzhen TV play channel. A main difference among these sub-channels is generally embodied in a channel number or name, and therefore, the difference among station logos is small. If these sub-channels are separately used as independent television channels, station logo image attributes in correspondingly generated station logo templates are hard to distinguish, for example, CCTV8 and CCTV9 are quite similar if regarded as integral station logo image attributes respectively, which increases a rate of false station logo detection and identification. To distinguish these similar station logos, when a station logo is expressed in a form of [a television station logo+a sub-channel name/number], the station logo is classified into two levels. As shown in FIG. 5, channels belonging to a same television station (such as CCTV) are used as children (such as 1, 2 ... and 15 in FIG. 5), a common part (that is, the CCTV part) is used as a parent, and a corresponding station logo template includes a parent template and multiple child templates. A storage form of station logo templates corresponding to this category of station logos may be expressed as (type, rect, mask, histogram/hashcode, sub-model), where type, rect, mask and histogram/hashcode in the front part are a station logo type, station logo position information, mask information and a set of station logo image attributes in a parent template (that is, a station logo image used as a parent), and the sub-model part also includes data of type, rect, mask and histogram/hashcode, which are a station logo type, station logo position information, mask information and a set of station logo image attributes in a child template (that is, a station logo image used as a child template).

Further, in an embodiment, the step of extracting, corresponding to each station logo template in a station logo template library, a station logo characteristic set includes: if the station logo template includes a parent template, extracting, corresponding to a parent template in each station logo template, a station logo characteristic set.

The step of matching the station logo characteristic set corresponding to each station logo template with a characteristic set in a corresponding station logo template includes: calculating a first similarity score between the extracted station logo characteristic set and a characteristic set in the parent template, to identify a station logo template with a highest first similarity score.

In an embodiment, after the step of calculating a first similarity score between the extracted station logo characteristic set and a characteristic set in the parent template, to identify a station logo template with a highest first similarity score, the method further includes: if the station logo template with the highest first similarity score has a child template, further extracting, corresponding to the child template in the station logo template with the highest first similarity score, a station logo characteristic set; and calculating a second similarity score between the station logo characteristic set corresponding to the child template and a characteristic set in the child template, to identify a station logo template with a highest second similarity score. In this embodiment, a television channel corresponding to the station logo template with the highest second similarity score is chosen as an identification result.

Figure 6:
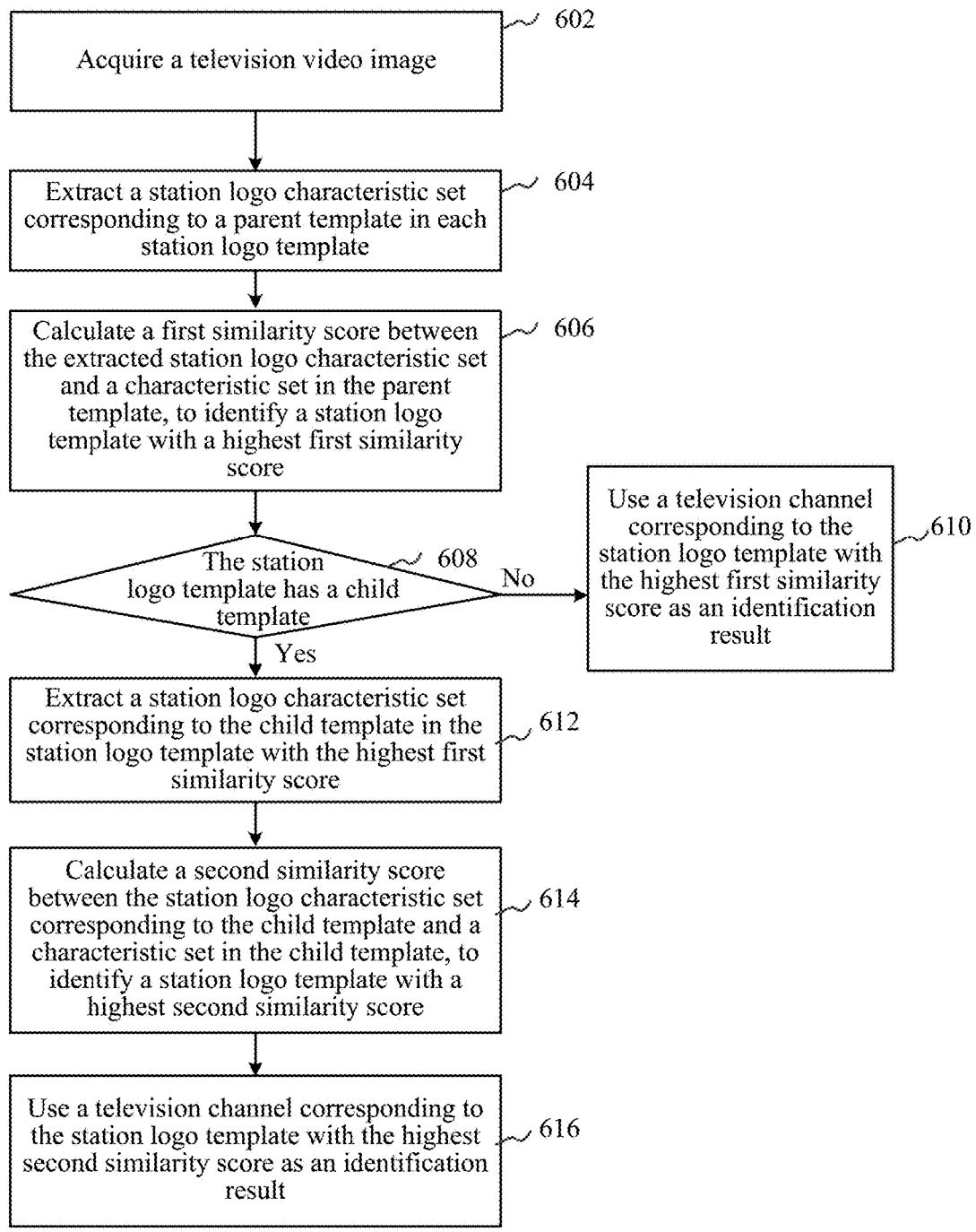
FIG. 6 is a schematic flowchart of comparison by using a layered station logo template in accordance with some embodiments of the present application.
Figure 9:
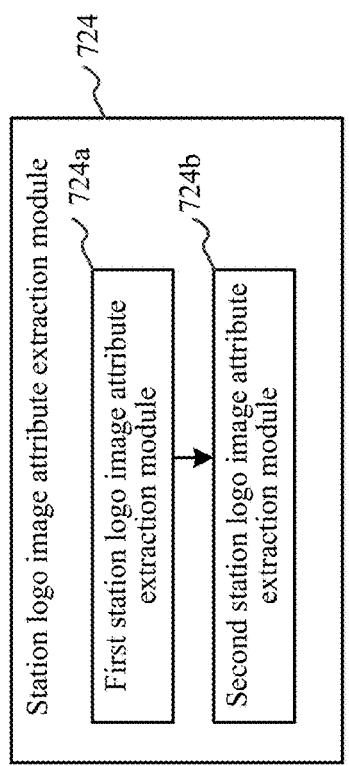
FIG. 9 is a structural block diagram of a station logo image attribute extraction module in FIG. 8.
Figure 10:
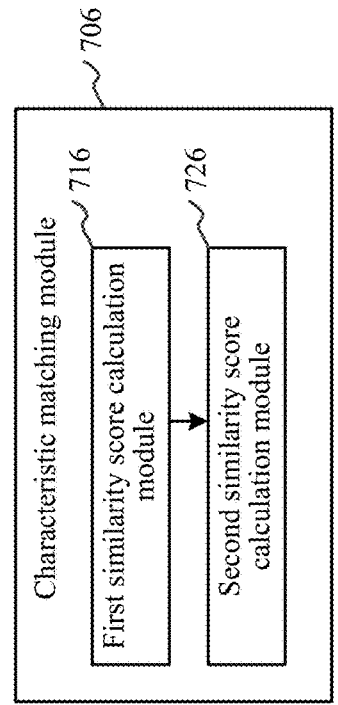
FIG. 10 is a structural block diagram of a characteristic matching module in FIG. 7.

The following describes in detail a process of performing a television channel identification method by using a layered station logo template. As shown in FIG. 6, the specific process includes the following steps:

Step 602: Acquire a television video image.

Step 604: Extract a station logo characteristic set corresponding to a parent template in each station logo template.

In this embodiment, a station logo characteristic set corresponds to each station logo template in the station logo template library. If a station logo template only has one level of characteristic data, it is regarded that the station logo template only has a parent template but has no child template; and if the station logo template has two levels of characteristic data, it is regarded that the station logo template has a parent template and a corresponding child template, where the parent template stores characteristic data of a station logo image used as a parent, and the child template stores corresponding characteristic data of a station logo image used as a child. For example, in a station logo template corresponding to CCTV8, a parent template stores characteristic data of the station logo image "CCTV", and a child template stores characteristic data of the corresponding image "8".

In this embodiment, corresponding to a parent template in each standard template, a station logo image region in the television video image is determined according to station logo position information and mask information stored in the parent template. Then a set of station logo image attributes of the determined station logo image region is extracted in an image characteristic extraction manner corresponding to a station logo type in the parent template. For example, if a set of station logo image attributes stored in the parent template is a block-level color histogram, a block-level color histogram of the station logo image region is extracted correspondingly. For a specific image characteristic extraction manner, refer to the foregoing description, which is not described repeatedly herein.

Step 606: Calculate a first similarity score between the extracted station logo characteristic set and a characteristic set in the parent template, to identify a station logo template with a highest first similarity score.

As described above, different parameters may be calculated for different types of station logo image attributes according to station logo types stored in parent templates, and used as a similarity score between station logo image attributes. For example, if the extracted station logo image attribute of the television video image is a block-level color histogram, any one of a Bhattacharyya distance, an Euclidean distance, a histogram correlation and a histogram intersection between the block-level color histogram and a block-level color histogram in the parent template may be calculated and used as the first similarity score.

Step 608: Determine whether the station logo template has a child template, and if yes, perform step 610; otherwise, perform step 612.

Step 610: Use a television channel corresponding to the station logo template with a highest first similarity score as an identification result.

In this embodiment, if the station logo template has no child template but only a level of parent template, a television channel number corresponding to the station logo template with the highest first similarity score may be directly used as an output result.

Step 612: Extract a station logo characteristic set corresponding to the child template in the station logo template with the highest first similarity score.

In this embodiment, if the station logo template with the highest first similarity score has a child template, it indicates that multiple station logo templates with the highest first similarity score are obtained, and a station logo characteristic set needs to be further corresponding to child templates in the station logo templates with the highest first similarity score. Likewise, a station logo image region in the television video image may be determined according to station logo position information and mask information stored in the child template. Then a set of station logo image attributes of the determined station logo image region is extracted in an image characteristic extraction manner corresponding to a station logo type in the child template. For a specific image characteristic extraction manner, refer to the foregoing description, which is not described repeatedly herein either.

Step 614: Calculate a second similarity score between the station logo characteristic set corresponding to the child template and a characteristic set in the child template, to identify a station logo template with a highest second similarity score.

As described above, different parameters may further be calculated for different types of station logo image attributes according to station logo types stored in child templates, and used as a similarity score between station logo image attributes. A higher second similarity score indicates that a station logo image, representing a sub-channel, in the television video image is more similar to a station logo image corresponding to a child template in the station logo template.

Step 616: Use a television channel corresponding to the station logo template with the highest second similarity score as an identification result.

In this embodiment, after the station logo template with the highest second similarity score (that is, a station logo template with a most matching child template) is obtained, a television channel number corresponding to the station logo template is used as an output result.

In this embodiment, by using a hierarchical station logo template, a station logo image including a sub-channel is compared with a parent template and then a child template; and by matching templates level by level, each sub-channel can be effectively distinguished, thereby further improving precision of station logo identification.

In another embodiment, the steps of matching the station logo characteristic set corresponding to each station logo template with a characteristic set in a corresponding station logo template; and using a television channel corresponding to a station logo template with a highest similarity score as an identification result include: inputting the station logo characteristic set corresponding to each station logo template to a pre-trained categorizer, to obtain a categorization result of a station logo in the television video image. The categorizer is obtained by training a characteristic matrix, where the characteristic matrix includes station logo image attributes extracted from multiple image samples of multiple television channels.

In this embodiment, station logos of different television stations may be regarded as different categories, and assuming that station logos of M television stations need to be identified, there are M categories. In offline training of a categorizer, station logo image attributes may be extracted from N images of each television channel of M television channels, and the extracted station logo image attributes are combined with corresponding category numbers (that is, television channel numbers) to form a characteristic matrix. For example, d-dimensional block-level color histograms are extracted. Then the M*N d-dimensional block-level color histograms are combined and labeled with category numbers, to obtain the following matrix form:

$$\begin{bmatrix} 1 & p_{11}^1 & p_{12}^1 & L & p_{1d}^1 \\ 1 & p_{21}^1 & p_{22}^1 & L & p_{2d}^1 \\ M & M & M & O & M \\ 1 & p_{N1}^1 & p_{N2}^1 & L & p_{Nd}^1 \\ 2 & p_{11}^2 & p_{12}^2 & L & p_{1d}^2 \\ 2 & p_{21}^2 & p_{22}^2 & L & p_{2d}^2 \\ M & M & M & O & M \\ M & p_{11}^M & p_{12}^M & L & p_{1d}^M \\ M & M & M & O & M \\ M & p_{N1}^M & p_{N2}^M & L & p_{Nd}^M \end{bmatrix}$$

In an element $p_{ij}^m$, $m, 1 \leq m \leq M$ represents a category number, $i, 1 \leq i \leq N$ represents an image sample number, and j,1≤j≤d represents a characteristic dimension. The characteristic matrix is trained in a training module of the categorizer, to obtain a categorizer model w=y(x), where the input is a set of station logo image attributes, such as a d-dimensional block-level color histogram, and the output is a category number, that is, a television channel number. When a categorizer obtained by training is used to identify a station logo, only a set of station logo image attributes x* extracted from a television video image needs to be input to the categorizer to obtain a corresponding category number w*, that is, an identified television channel number.

In this embodiment, a categorizer may be trained according to different station logo image attributes, and after the categorizer is trained, for a television video image captured in real time, after an extracted station logo image attribute is directly input to the categorizer, an identified television channel number can be directly obtained, which is more simple and convenient to implement.

Figure 7:
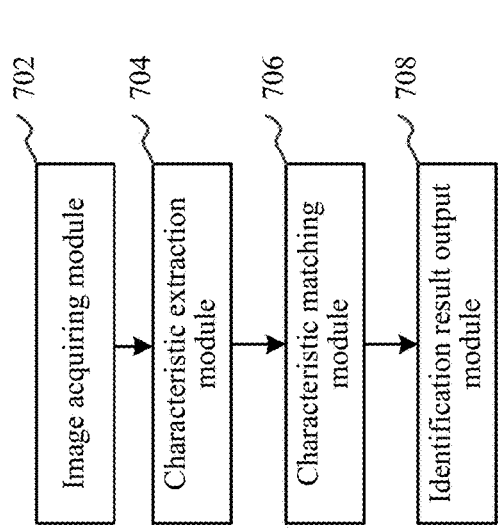
FIG. 7 is a structural block diagram of a television channel identification apparatus in accordance with some embodiments of the present application.
Figure 8:
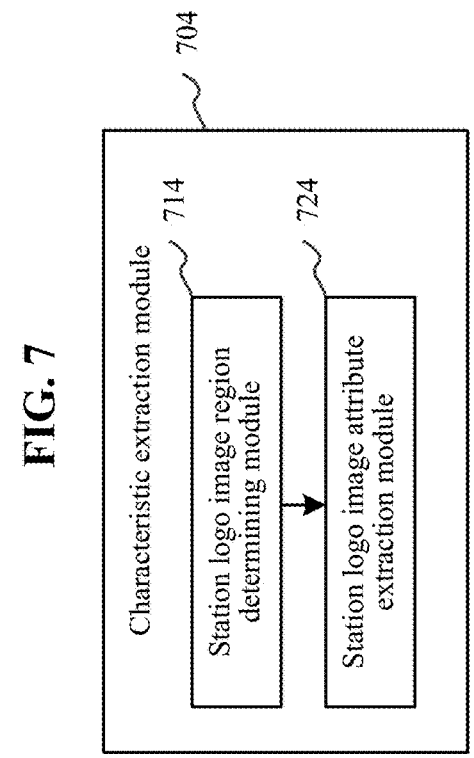
FIG. 8 is a structural block diagram of a characteristic extraction module in FIG. 7.

As shown in FIG. 7, in an embodiment, a television channel identification apparatus is further provided, where the apparatus includes: an image acquiring module 702, configured to acquire a television video image; a characteristic extraction module 704, configured to extract, corresponding to each station logo template in a station logo template library, a station logo characteristic set; a characteristic matching module 706, configured to match the station logo characteristic set corresponding to each station logo template with a characteristic set in a corresponding station logo template; and an identification result output module 708, configured to use a television channel corresponding to a station logo template with a highest similarity score as an identification result.

In a preferred embodiment, the television video image acquired by the image acquiring module 702 may be a television video image captured from a video signal.

In an embodiment, characteristics in the station logo template include a station logo type, station logo position information, a mask region and a set of station logo image attributes.

In this embodiment, the characteristic extraction module 704 includes: a station logo image region determining module 714, configured to determine a station logo image region in the television video image according to the station logo position information and the mask region in the station logo template; and a set of station logo image attribute extraction module 724, configured to extract a set of station logo image attributes of the station logo image region according to the station logo type in the station logo template.

Further, in an embodiment, the station logo image attribute extraction module 724 includes: a first station logo image attribute extraction module 724a, configured to: if the station logo type in the station logo template is static opaque station logo, extract a pixel value of the station logo image region; a second station logo image attribute extraction module 724b, configured to: if the station logo type in the station logo template is static semi-transparent station logo, extract a perceptual hash value of the station logo image region.

In an embodiment, the characteristic matching module 706 includes: a first similarity score calculation module 716, configured to: if the station logo type in the station logo template is static opaque station logo, calculate an image difference between the pixel value and the station logo image attribute in the station logo template, where a smaller image difference indicates a higher similarity score; and a second similarity score calculation module 726, configured to: if the station logo type in the station logo template is static semi-transparent station logo, compare the perceptual hash value with the station logo image attribute in the station logo template bit by bit, to obtain a percentage of the number of same bits thereof to the total length of binary codes, where a larger percentage indicates a higher similarity score.

In an embodiment, the station logo template includes a parent template and multiple child templates located in the same station logo template as the parent template.

In this embodiment, the characteristic extraction module 704 is configured to: if the station logo template includes a parent template, extract, corresponding to a parent template in each station logo template, a station logo characteristic set.

Further, in an embodiment, the characteristic matching module 706 is configured to calculate a first similarity score between the extracted station logo characteristic set and a characteristic set in the parent template, to identify a station logo template with a highest first similarity score.

In an embodiment, the characteristic extraction module 704 is further configured to: if the station logo template with the highest first similarity score includes a child template, further extract, corresponding to the child template in the station logo template with the highest first similarity score, a station logo characteristic set.

In this embodiment, the characteristic matching module 706 is further configured to calculate a second similarity score between the station logo characteristic set corresponding to the child template by the characteristic extraction module and a characteristic set in the child template, to identify a station logo template with a highest second similarity score.

The identification result output module 708 is configured to use a television channel corresponding to the station logo template with the highest second similarity score as an identification result.

In an embodiment, the television channel identification apparatus further includes a categorization module (not shown in the figure), configured to input the station logo characteristic set corresponding to each station logo template to a pre-trained categorizer, to obtain a categorization result of a station logo in the television video image. The categorizer is obtained by training a characteristic matrix, where the characteristic matrix includes station logo image attributes extracted from multiple image samples of multiple television channels.

FIG. 11 is a block diagram illustrating components of a digital video conversion device 104 (e.g., a set top box) in accordance with some embodiments of the present application. The digital video conversion device 104 may include memory 1112 (which may include one or more non-transitory computer readable storage mediums), one or more processors 1102, a TV signal adapter 1110, radio-frequency (RF) circuitry 1108, input/output (I/O) system 1106, and a communication interface 1104. These components may communicate over one or more communication buses 1114.

Memory 1112 may include high-speed random access memory and may also include non-transitory computer readable storage medium, such as one or more magnetic disk storage devices, flash memory devices, or other non-volatile solid-state memory devices. The one or more processors 1102 run or execute various software programs and/or sets of instructions stored in memory 1112 to perform various functions for the digital video conversion device 104 and to process data.

RF circuitry 1108 converts electrical signals to/from electromagnetic signals and communicates with communications networks and other communications devices (e.g., a mobile terminal) via the electromagnetic signals. RF circuitry 408 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

In some embodiments, the software components stored in the memory 1112 include operating system 1116, communication module (or set of instructions) 1118, TV signal processing module (or set of instructions) 1120, TV channel identifying module (or sets of instructions) 1122, and TV station logo template database 1132.

The operating system 1116 includes various software components and/or drivers for controlling and managing general system tasks (e.g., memory management, storage device control, power management, etc.) and facilitates communication between various hardware and software components. The communication module 1118 facilitates communication with other devices over the communication buses 1114 and also includes various software components for handling data received by the RF circuitry 1108. The TV signal processing module 1120 receives TV signals from the TV signal source 108 and processes (e.g., decoding, decrypting, etc.) the TV signals so that the TV signal can be broadcasted on the TV display 106. In addition, the TV signal processing module 1120 receives user instructions from a remote control to change the TV program from one channel to another channel.

The TV channel identifying module 1122 may include the following applications (or sets of instructions), or a subset or superset thereof:

an image acquire sub-module 1124 for acquiring an image from the TV signals coming from the TV signal source and broadcasted on the TV display;

a station logo characteristic extract sub-module 1126 for extracting station logo characteristic set from the acquired TV video image;

a station logo characteristic match sub-module 1128 for comparing the station logo characteristic set with station logo templates stored in the station logo template database 1132 to determine the TV channel information of the TV signals; and a match result output sub-module 1130 for returning the match result to the requesting mobile terminal.

The station logo template database 1132 includes a plurality of entries corresponding to different TV channels (1134-1, . . . , 1134-N). For each TV channel, there is a station logo template (1136-1, . . . , 1136-N) and TV channel information (1140-1, . . . , 1140-N). The station logo template further includes a set of parameters (1138-1, . . . , 1138-N) such as station logo type, station logo position information, mask information, and one or more station logo image attributes as described above in connections with FIGS. 2 and 6, respectively.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. Persons of ordinary skill in the art may understand that all or a part of the flow of the method according to the embodiments may be implemented by a program instructing relevant hardware. The program may be stored in a computer readable storage medium. When the program is executed, the flow of the embodiment of the foregoing method may be included. The storage medium may be a magnetic disk, an optical disk, a read-only memory (Read-Only Memory, ROM) or a random access memory (Random Access Memory, RAM) and the like.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of determining TV channel information, the method comprising:
   at a digital video conversion device having one or more processors, radio-frequency circuitry and memory for storing program modules to be executed by the one or more processors, wherein the digital video conversion device is communicatively coupled to a TV set and a TV signal source, respectively, so as to pass TV signals from the TV signal source to the TV set:
      receiving a TV channel identification request from a mobile terminal via a wireless communication channel;
      in response to the TV channel identification request:
         acquiring an image from the TV signals currently broadcasted on the TV set;
         extracting a plurality of station logo characteristic sets from the image, wherein each station logo characteristic set corresponds to one of a plurality of station logo templates and each station logo template includes a station logo type and one or more station logo image attributes corresponding to the station logo template, further including:
            for a first station logo template with a static opaque station logo type, generating a first station logo image attribute for a station logo image region in the image; and
            for a second station logo template with a static semi-transparent station logo type, generating a second station logo image attribute for the station logo image region in the image;
         calculating a similarity score between the set of station logo image attributes of each station logo characteristic set and the one or more station logo image attributes of a corresponding station logo template according to the corresponding station logo type, including:
            in accordance with a determination that the first station logo attribute corresponds to the static opaque station logo type, obtaining a first similarity score for the first station logo template based on the first station logo image attribute in accordance with a distance-based metric;
            in accordance with a determination that the second station logo attribute corresponds to the semi-transparent station logo type, obtaining a second similarity score for the second station logo template based on the second station logo image attribute in accordance with a statistics-based metric;
         identifying one of the plurality of station logo templates as matching the image based on relative magnitudes of their similarity scores, including the first similarity score for the first station logo template and the second similarity score for the second station logo template; and
         returning TV channel information associated with the identified station logo template to the mobile terminal.

2. The method of claim 1, wherein each station logo template includes station logo position information and station logo mask information.

3. The method of claim 2, wherein the step of extracting a plurality of station logo characteristic sets from the image further includes:
   for each station logo template:
      identifying a station logo image region in the image according to the station logo position information;
      processing the identified station image logo region using the station logo mask information; and
      calculating one or more station logo image attributes for the processed station logo image region according to the station logo type.

4. The method of claim 3, wherein the first station logo image attribute is a normalized block-level color histogram for the processed station logo image region.

5. The method of claim 3, wherein the second station logo image attribute is a perceptual hash value for the processed station logo image region.

6. The method of claim 1, wherein at least one of the plurality of station logo templates further includes a parent station logo template, the parent station logo template further having multiple child station logo templates.

7. The method of claim 6, further comprising:
   after identifying the parent station logo template as matching the image based on their similarity scores:
      extracting a plurality of station logo characteristic sets from the image, wherein each station logo characteristic set corresponds to one child station logo template associated with the identified parent station logo template;
      calculating a second similarity score between each station logo characteristic set and a corresponding child station logo template;
      identifying one of the plurality of child station logo templates as matching the image based on their second similarity scores; and
      returning TV channel information associated with the identified parent and child station logo templates to the mobile terminal.

8. A digital video conversion device, wherein the digital video conversion device is communicatively coupled to a TV set and a TV signal source, respectively, so as to pass TV signals from the TV signal source to the TV set, the digital video conversion device further comprising:
   one or more processors;
   radio-frequency circuitry;
   memory; and
   one or more program modules stored in the memory, wherein the one or more program modules include instructions to be executed by the one or more processors, the instructions further including:
      receiving a TV channel identification request from a mobile terminal via a wireless communication channel;
      in response to the TV channel identification request:
         acquiring an image from the TV signals currently broadcasted on the TV set;
         extracting a plurality of station logo characteristic sets from the image, wherein each station logo characteristic set corresponds to one of a plurality of station logo templates and each station logo template includes a station logo type and one or more station logo image attributes corresponding to the station logo template, further including:

for a first station logo template with a static opaque station logo type, generating a first station logo image attribute for a station logo image region in the image; and for a second station logo template with a static semi-transparent station logo type, generating a second station logo image attribute for the station logo image region in the image;

calculating a similarity score between the set of station logo image attributes of each station logo characteristic set and the one or more station logo image attributes of a corresponding station logo template according to the corresponding station logo type, including:

in accordance with a determination that the first station logo attribute corresponds to the static opaque station logo type, obtaining a first similarity score for the first station logo template based on the first station logo image attribute in accordance with a distance-based metric;

in accordance with a determination that the second station logo attribute corresponds to the semi-transparent station logo type, obtaining a second similarity score for the second station logo template based on the second station logo image attribute in accordance with a statistics-based metric;

identifying one of the plurality of station logo templates as matching the image based on relative magnitudes of their similarity scores, including the first similarity score for the first station logo template and the second similarity score for the second station logo template; and returning TV channel information associated with the identified station logo template to the mobile terminal.

9. The digital video conversion device of claim 8, wherein each station logo template includes station logo position information and station logo mask information.

10. The digital video conversion device of claim 9, wherein the instruction for extracting a plurality of station logo characteristic sets from the image further includes instructions for:

for each station logo template:
identifying a station logo image region in the image according to the station logo position information;
processing the identified station image logo region using the station logo mask information; and
calculating one or more station logo image attributes for the processed station logo image region according to the station logo type.

11. The digital video conversion device of claim 10, wherein the first station logo image attribute is a normalized block-level color histogram for the processed station logo image region.

12. The digital video conversion device of claim 10, wherein the second station logo image attribute is a perceptual hash value for the processed station logo image region.

13. The digital video conversion device of claim 8, wherein at least one of the plurality of station logo templates further includes a parent station logo template, the parent station logo template further having multiple child station logo templates.

14. The digital video conversion device of claim 13, wherein the instructions further include:

after identifying the parent station logo template as matching the image based on their similarity scores:

extracting a plurality of station logo characteristic sets from the image, wherein each station logo characteristic set corresponds to one child station logo template associated with the identified parent station logo template;

calculating a second similarity score between each station logo characteristic set and a corresponding child station logo template;

identifying one of the plurality of child station logo templates as matching the image based on their second similarity scores; and returning TV channel information associated with the identified parent and child station logo templates to the mobile terminal.

15. A non-transitory computer readable storage medium in conjunction with a digital video conversion device storing one or more program modules, wherein the digital video conversion device is communicatively coupled to a TV set and a TV signal source, respectively, so as to pass TV signals from the TV signal source to the TV set, wherein the one or more program modules further include instructions, which, when executed by one or more processors of the digital video conversion device, cause the processors to perform operations including:

receiving a TV channel identification request from a mobile terminal via a wireless communication channel;

in response to the TV channel identification request:
acquiring an image from the TV signals currently broadcasted on the TV set;

extracting a plurality of station logo characteristic sets from the image, wherein each station logo characteristic set corresponds to one of a plurality of station logo templates and each station logo template includes a station logo type and one or more station logo image attributes corresponding to the station logo template, further including:

for a first station logo template with a static opaque station logo type, generating a first station logo image attribute for a station logo image region in the image; and for a second station logo template with a static semi-transparent station logo type, generating a second station logo image attribute for the station logo image region in the image;

calculating a similarity score between the set of station logo image attributes of each station logo characteristic set and the one or more station logo image attributes of a corresponding station logo template according to the corresponding station logo type, including:

in accordance with a determination that the first station logo attribute corresponds to the static opaque station logo type, obtaining a first similarity score for the first station logo template based on the first station logo image attribute in accordance with a distance-based metric;

in accordance with a determination that the second station logo attribute corresponds to the semi-transparent station logo type, obtaining a second similarity score for the second station logo template based on the second station logo image attribute in accordance with a statistics-based metric;

identifying one of the plurality of station logo templates as matching the image based on relative magnitudes of their similarity scores, including the first similarity score for the first station logo template and the second similarity score for the second station logo template; and returning TV channel information associated with the identified station logo template to the mobile terminal.

16. The non-transitory computer readable storage medium of claim 15, wherein a station logo template includes a station logo type, station logo position information, station logo mask information, and one or more station logo image attributes.

17. The non-transitory computer readable storage medium of claim 16, wherein the instruction for extracting a plurality of station logo characteristic sets from the image further includes instructions for:

for each station logo template:
  identifying a station logo image region in the image according to the station logo position information;
  processing the identified station image logo region using the station logo mask information; and
  calculating one or more station logo image attributes for the processed station logo image region according to the station logo type.

18. The non-transitory computer readable storage medium of claim 17, wherein the first station logo image attribute is a normalized block-level color histogram for the processed station logo image region.

19. The non-transitory computer readable storage medium of claim 17, wherein the second station logo image attribute is a perceptual hash value for the processed station logo image region.

20. The non-transitory computer readable storage medium of claim 15, wherein at least one of the plurality of station logo templates further includes a parent station logo template, the parent station logo template further having multiple child station logo templates.

* * * * *